(12) United States Patent
Yang et al.

(10) Patent No.: US 8,842,376 B2
(45) Date of Patent: Sep. 23, 2014

(54) PLASTIC OPTICAL LENS

(71) Applicant: Largan Precision Co., Ltd., Taichung (TW)

(72) Inventors: Sheng-Yu Yang, Taichung (TW); Yeo-Chih Huang, Taichung (TW)

(73) Assignee: Largan Precision Co., Ltd, Taichung (TW)

( * ) Notice: Subject to any disclaimer, the term of this patent is extended or adjusted under 35 U.S.C. 154(b) by 105 days.

(21) Appl. No.: 13/661,243

(22) Filed: Oct. 26, 2012

(65) Prior Publication Data

US 2013/0308210 A1 Nov. 21, 2013

(30) Foreign Application Priority Data

May 18, 2012 (TW) .............................. 101117727 A

(51) Int. Cl.
*G02B 9/60* (2006.01)
*G02B 3/08* (2006.01)

(52) U.S. Cl.
USPC .......................................... 359/763; 359/741

(58) Field of Classification Search
USPC ........... 359/642, 741, 809, 784, 763; 264/1.1, 264/1.32, 645
See application file for complete search history.

(56) References Cited

U.S. PATENT DOCUMENTS

2011/0279904 A1* 11/2011 Itoh .............................. 359/642

* cited by examiner

*Primary Examiner* — Alicia M Harrington
(74) *Attorney, Agent, or Firm* — Morris, Manning & Martin LLP; Tim Tingkang Xia, Esq.

(57) ABSTRACT

This invention provides an injection-molded plastic optical lens comprising from a center to an edge thereof an optical effective portion, a connecting portion and a peripheral portion that are concentrically formed. The plastic optical lens has an outer diameter D. The optical effective portion has an edge thickness ET1 and a central thickness CT, the connecting portion has a minimum thickness ET2, and the plastic optical lens satisfies the following relations of CT≤0.30 mm and ET2/ET1<1.0. At least one lens element with refractive power can be disposed at each of the object side and the image side of the plastic optical lens of the present invention to form an optical lens assembly.

39 Claims, 7 Drawing Sheets

PLASTIC OPTICAL LENS

CROSS-REFERENCE TO RELATED APPLICATION

This non-provisional application claims priority under 35 U.S.C. §119(a) on Patent Application No. 101117727 filed in Taiwan (R.O.C.) on May 18, 2012, the entire contents of which are hereby incorporated by reference.

BACKGROUND OF THE INVENTION

1. Field of the Invention

The present invention relates to an injection-molded plastic optical lens.

2. Description of the Prior Art

The uneven thickness of a plastic article is one of the important factors that adversely affect the molding result during the plastic injection molding process. After a molten plastic material has been injected into a mold's cavity whose thickness is uneven, the portion of the molten plastic material in a region of the mold with a greater depth likely shrinks during the cooling process because it takes longer to be cooled. Moreover, the portion of the molten plastic material in a region of the mold with a smaller depth will solidify first because it takes less time to be cooled. Consequently, the stress of the solidified portion of the plastic article (in the region of the mold with a smaller depth) will increase and cause warpage in the portion of the plastic article in the region of the mold with a greater depth. Further, the molten plastic material flows through the region of the mold with a greater depth at a speed higher than the speed at which it flows through the region of the mold with a smaller depth, and this may result in filling imbalances. All of the aforementioned problems are resulted from the uneven thickness of the plastic article that adversely affects the molding result during the plastic injection molding process.

Similarly, the thickness of a plastic optical lens is one of the important factors that would influence the injection molding process. A lens generally comprises three portions: an optical effective portion pertaining to the actual optical imaging, a peripheral portion for assembling the lens, and a connecting portion for connecting the optical effective portion and the peripheral portion. Generally, the connecting portion has a thickness substantially the same as that of the optical effective portion and is of a simple shape for connecting with the optical effective portion so that the molten plastic material can favorably fill the lens mold during the injection molding process while achieving a uniform shrinkage. However, when a lens to be formed has a compact size with an extremely thin central region of the optical effective portion thereof, the difference in thickness between the connecting portion and the central region of the optical effective portion is increased, thereby having unsatisfactory molding results as described above. This will seriously affect the image quality of a plastic optical lens for which high precision operation is required.

FIG. 1A is a top view of a prior art plastic optical lens 100. The plastic optical lens 100 comprises, in order from a center to an edge thereof: an optical effective portion 01, a connecting portion 02 and a peripheral portion 03 having a sprue gate portion 104. During the process of manufacturing the plastic optical lens 100 by plastic injection molding, the molten plastic material is injected into a cavity of a mold through a sprue gate corresponding to the sprue gate portion 104. FIG. 1B is a sectional view of the prior art plastic optical lens 100 along the line A-A' in FIG. 1A. As shown in FIG. 1B, the thicknesses of the optical effective portion 01 and the connecting portion 02 are not uniform, and the connecting portion 02 is thicker than the optical effective portion 01. In other words, the plastic optical lens 100 has a peripheral thickness which is greater than its central thickness. Therefore, an unsatisfactory molding result caused due to the non-uniform thickness of the molded article may occur in the plastic optical lens 100 during the plastic injection molding process and further adversely affect the optical image quality of the plastic optical lens 100.

SUMMARY OF THE INVENTION

The present invention provides a plastic optical lens characterized in that a connecting portion having a thickness reducing region is arranged at between an optical effective portion and a peripheral portion thereof to minimize the difference in the thicknesses between the central region and the peripheral region of the plastic optical lens. The arrangement of the thickness reducing region enables satisfactory filling of the lens mold with the molten plastic material during the injection molding process without abnormal shrinkage. Consequently, the production yield for the molded article can be increased.

In one aspect, the present invention provides an injection-molded plastic optical lens having an object-side surface and an image-side surface and comprising, in order from a center to an edge thereof: an optical effective portion, a connecting portion and a peripheral portion that are concentrically formed; wherein the lens has an outer diameter D, the optical effective portion has an edge thickness ET1 and a central thickness CT, the connecting portion has a minimum thickness ET2, the peripheral portion has a sprue gate portion with a thickness GT at an outer side thereof, and the plastic optical lens satisfies the following relations:

$CT \leq 0.30$ mm, $ET2/ET1 < 1.0$.

In another aspect, the present invention provides an optical lens assembly comprising: at least one plastic optical lens and at least one lens element with refractive power arranged at each of an object side and an image side of the at least one plastic optical lens, and characterized in that the at least one plastic optical lens comprises, in order from a center to an edge thereof: an optical effective portion, a connecting portion and a peripheral portion that are concentrically formed; wherein the at least one plastic optical lens has an outer diameter D, the optical effective portion has an edge thickness ET1 and a central thickness CT, the connecting portion has a minimum thickness ET2, and the at least one plastic optical lens satisfies the following relations:

$CT \leq 0.30$ mm, $ET2/ET1 < 0.8$, $ET2/CT < 1.2$.

In another aspect, the present invention provides an optical lens assembly comprising: at least one plastic optical lens and at least one lens element with refractive power arranged at each of an object side and an image side of the at least one plastic optical lens, and characterized in that the at least one plastic optical lens comprises, in order from a center to an edge thereof: an optical effective portion, a connecting portion and a peripheral portion that are concentrically formed; wherein the at least one plastic optical lens has an outer diameter D, the optical effective portion has an edge thickness ET1 and a central thickness CT, the connecting portion has a minimum thickness ET2, and the at least one plastic optical lens satisfies the following relations:

CT≤0.35 mm,

ET2/ET1<1.0.

As described above, at least one lens element with refractive power is disposed at each of the object side and the image side of the plastic optical lens of the present invention to form an optical lens assembly.

DETAILED DESCRIPTION OF THE PREFERRED EMBODIMENTS

Figure 1A:
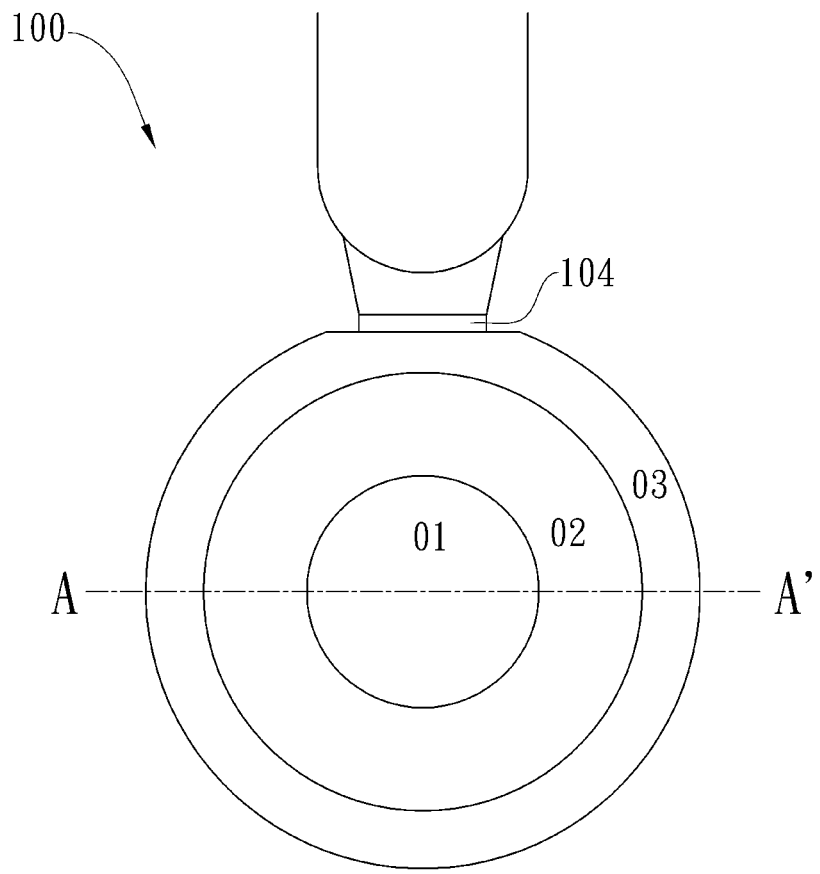
FIG. 1A is a top view of a prior art plastic optical lens.
Figure 1B:
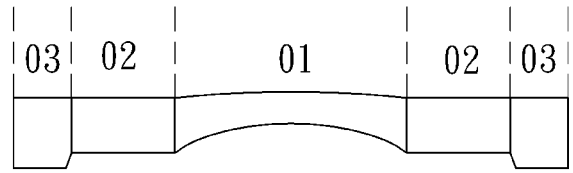
FIG. 1B is a sectional view of the prior art plastic optical lens along the line A-A' in FIG. 1A.

The present invention provides an injection-molded plastic optical lens having an object-side surface and an image-side surface and comprising, in order from a center to an edge thereof: an optical effective portion, a connecting portion and a peripheral portion that are concentrically formed; wherein the lens has an outer diameter D, the optical effective portion has an edge thickness ET1 and a central thickness CT, the connecting portion has a minimum thickness ET2 for minimizing the difference in thickness between a central region and a peripheral region of the lens, the peripheral portion has a sprue gate portion with a thickness GT corresponding to a sprue gate through which the molten plastic material is injected into a cavity of a mold, and the plastic optical lens satisfies the following relations:

CT≤0.30 mm,

ET2/ET1<1.0.

The present invention provides a thin lens that satisfies the following relation: CT≤30 mm. Preferably, the thin lens satisfies the following relation: CT≤0.25 mm.

In addition, when the present invention satisfies the relation of ET2/ET1<1.0, the minimum thickness ET2 of the connecting portion is smaller than the edge thickness ET1 of the optical effective portion. The thickness reducing region of the connecting portion can minimize the difference in thickness between the central region and the peripheral region of the lens. The arrangement of the thickness reducing region enables satisfactory filling of the lens mold's cavity with the injected molten plastic material during the injection molding process. Moreover, various portions of the molten plastic material in the lens mold are cooled at similar speeds, thus abnormal shrinkage will not likely occur, thereby improving the molding result for the plastic optical lens of the present invention and ensuring the image quality of the lens. Preferably, the present invention satisfies the following relation: ET2/ET1<0.8.

The above-mentioned plastic optical lens can satisfy the following relation: ET2/CT<1.2. The smaller the proportion of the minimum thickness ET2 of the connecting portion to the central thickness CT of the optical effective portion, the less the difference in thickness between the peripheral region and the central region of the lens. In other words, the difference in depth between the regions of the lens mold corresponding to the peripheral region and the central region of the lens is less distinct, and this enables satisfactory filling of the lens mold's cavity with the injected molten plastic material during the injection molding process. Moreover, various portions of the molten plastic material in the lens mold are cooled at similar speeds, thus abnormal shrinkage will not likely occur, thereby improving the molding result for the plastic optical lens of the present invention and ensuring the image quality of the lens. Preferably, the present invention can satisfy the following relation: ET2/CT<1.0.

The aforementioned plastic optical lens can satisfy the following relation: ET2≤0.25 mm. The smaller the thickness of connecting portion is, the faster the molten plastic material will be cooled, and the less easily abnormal shrinkage will occur during the cooling process. Consequently, the molding result of the lens is satisfactory and thereby to ensure the image quality of the lens. Preferably, the present invention can satisfy the following relation: ET2≤0.20 mm.

In another aspect, the aforementioned plastic optical lens of the present invention can satisfy the following relation: D/CT>14. The greater the outer diameter D of the lens is, the larger the space available for gradual variation in thickness of the connecting portion is. Consequently, the influence of the thickness reducing region on the optical effective portion upon the molding of the lens can be effectively reduced.

The aforementioned plastic optical lens of the present invention can satisfy the following relation: CT/ET1<1.0. The present invention provides a thin lens comprising an optical effective portion whose central region is thinner than the peripheral region so as to manufacture the lens having proper thickness and provide a satisfactory molding result.

The aforementioned plastic optical lens of the present invention can satisfy the following relation: ET2/GT<1.0. When the section of the connecting portion with the minimum thickness ET2 is thinner than the sprue gate portion with the thickness GT, the internal pressure can be balanced upon the molding of the lens to provide a more satisfactory molding result. Preferably, the present invention satisfies the following relation: ET2/GT<0.8.

At least one lens element with refractive power can be disposed at each of the object side and the image side of the aforementioned plastic optical lens of the present invention to form an optical lens assembly.

In another aspect, the present invention provides an optical lens assembly comprising: at least one plastic optical lens and at least one lens element with refractive power arranged at each of an object side and an image side of the at least one plastic optical lens, and characterized in that the plastic optical lens comprises, in order from a center to an edge thereof:

an optical effective portion, a connecting portion and a peripheral portion that are concentrically formed; wherein the at least one plastic optical lens has an outer diameter D, the optical effective portion has an edge thickness ET1 and a central thickness CT, the connecting portion has a minimum thickness ET2, and the plastic optical lens satisfies the following relations:

$$CT \leq 0.30 \text{ mm,}$$

$$ET2/ET1 < 0.8,$$

$$ET2/CT < 1.2.$$

The present invention provides a thin lens that satisfies the following relation: CT≤0.30 mm. Preferably, the thin lens satisfies the following relation: CT≤0.25 mm.

In addition, when the present invention satisfies the relation of ET2/ET1<0.8, the minimum thickness ET2 of the connecting portion is smaller than the edge thickness ET1 of the optical effective portion. The thickness reducing region of the connecting portion can minimize the difference in thickness between the central region and the peripheral region of the lens. The arrangement of the thickness reducing region enables satisfactory filling of the lens mold's cavity with the injected molten plastic material during the injection molding process. Moreover, various portions of the molten plastic material in the lens mold are cooled at similar speeds, thus abnormal shrinkage will not likely occur, thereby improving the molding result for the plastic optical lens of the present invention and ensuring the image quality of the lens.

The above-mentioned plastic optical lens can satisfy the following relation: ET2/CT<1.2. The smaller the proportion of the minimum thickness ET2 of the connecting portion to the central thickness CT of the optical effective portion, the less the difference in thickness between the peripheral region and the central region of the lens. In other words, the difference in depth between the regions of the lens mold corresponding to the peripheral region and the central region of the lens is less distinct, and this enables satisfactory filling of the lens mold's cavity with the injected molten plastic material during the injection molding process. Moreover, various portions of the molten plastic material in the lens mold are cooled at similar speeds, thus abnormal shrinkage will not likely occur, thereby improving the molding result for the plastic optical lens of the present invention and ensuring the image quality of the lens. Preferably, the present invention can satisfy the following relation: ET2/CT<1.0.

At least one lens element with refractive power can be disposed at each of the object side and the image side of the aforementioned plastic optical lens of the present invention to form an optical lens assembly. It is more facilitating to improve the image quality that the optical lens comprises more the optical lenses.

The aforementioned plastic optical lens can satisfy the following relation: ET≤0.25 mm. The smaller the thickness of connecting portion is, the faster the molten plastic material will be cooled, and the less easily abnormal shrinkage will occur during the cooling process. Consequently, the molding result of the lens is satisfactory and thereby to ensure the image quality of the lens. Preferably, the present invention can satisfy the following relation: ET≤0.20 mm.

The aforementioned plastic optical lens of the present invention can be made of a polycarbonate-based material so as to facilitate the molding result and save the cost.

The aforementioned plastic optical lens of the present invention can be made of a material containing a polar functional group, such as —OH, C=O, —COON or —NH2 so as to improve the Affinity of the material.

The material of the aforementioned plastic optical lens of the present invention satisfies the following relation: N>1.6 and V<32, wherein N represents the refractive index and V represents the Abbe number. The higher the refractive index of the material is, the thinner the lens can be made. As there is a trend for more compact devices, the present invention can be applied in a wider range of devices. The smaller the Abbe number of the material is, the more efficiently the chromatic aberration can be corrected for a lens assembly to improve the image quality. Preferably, the present invention satisfies the following relation: V<25.

In another aspect, the present invention provides an optical lens assembly comprising: at least one plastic optical lens and at least one lens element with refractive power arranged at each of an object side and an image side of the plastic optical lens, and characterized in that the plastic optical lens comprises, in order from a center to an edge thereof: an optical effective portion, a connecting portion and a peripheral portion that are concentrically formed; wherein the plastic optical lens has an outer diameter D, the optical effective portion has an edge thickness ET1 and a central thickness CT, the connecting portion has a minimum thickness ET2, and the plastic optical lens satisfies the following relations:

$$CT \leq 0.35 \text{ mm,}$$

$$ET2/ET1 < 1.0.$$

According to the above description, the present invention provides a thin lens that satisfies the following relation: CT<0.35 mm.

When the present invention satisfies the relation of ET2/ET1<1.0, the minimum thickness ET2 of the connecting portion is smaller than the edge thickness ET1 of the optical effective portion. The thickness reducing region of the connecting portion can minimize the difference in thickness between the central region and the peripheral region of the lens. The arrangement of the thickness reducing region enables satisfactory filling of the lens mold's cavity with the injected molten plastic material during the injection molding process. Moreover, various portions of the molten plastic material in the lens mold are cooled at similar speeds, thus abnormal shrinkage will not likely occur, thereby improving the molding result for the plastic optical lens of the present invention and ensuring the image quality of the lens.

The aforementioned plastic optical lens of the present invention can satisfy the following relation: ET2/CT<1.0. The smaller the proportion of the minimum thickness ET2 of the connecting portion to the central thickness CT of the optical effective portion, the less the difference in thickness between the peripheral region and the central region of the lens. In other words, the difference in depth between the regions of the lens mold corresponding to the peripheral region and the central region of the lens is less distinct, and this enables satisfactory filling of the lens mold's cavity with the injected molten plastic material during the injection molding process. Moreover, various portions of the molten plastic material in the lens mold are cooled at similar speeds, thus abnormal shrinkage will not likely occur, thereby improving the molding result for the plastic optical lens of the present invention and ensuring the image quality of the lens.

The aforementioned plastic optical lens of the present invention can satisfy the following relation: ET2≤0.25 mm. The smaller the thickness of the connecting portion is, the faster the molten plastic material is cooled, and the less easily abnormal shrinkage will occur during the cooling process.

Consequently, the molding result of the lens is satisfactory and thereby to ensure the image quality of the lens. Preferably, the present invention satisfies the following relation: ET2≤0.20 mm.

The aforementioned plastic optical lens of the present invention can satisfy the following relation: D/CT>14. The greater the outer diameter D of the lens is, the larger the space available for gradual variation in thickness of the connecting portion is. Consequently, the influence of the thickness reducing region on the optical effective portion upon the molding of the lens can be effectively reduced.

The aforementioned plastic optical lens of the present invention can satisfy the following relation: CT/ET1<1.0. The present invention provides a thin lens comprising an optical effective portion whose central thickness CT is smaller than the edge thickness ET1 so as to provide a satisfactory molding result.

The aforementioned plastic optical lens of the present invention can be made of a polycarbonate-based material, i.e. EP5000, OKP4, SP3810, OKP4HT materials used in embodiments 1~8 (shown in Table 1 Material column) so as to facilitate the molding result and save the cost.

The aforementioned plastic optical lens of the present invention can be made of a material containing a polar functional group, such as —OH, C═O, —COON or —NH2 so as to improve the Affinity of the material.

At least one lens element with refractive power can be disposed at each of the object side and the image side of the aforementioned plastic optical lens of the present invention to form an optical lens assembly. It is more facilitating to improve the image quality that the optical lens comprises more the optical lenses.

The embodiments of the present invention will be described in the following paragraphs by referring to the accompanying drawings so as to elucidate the objects and technical features of the present invention. The exemplary embodiments of the present invention are not intended as limitations but rather as examples of the present invention.

Eight embodiments of the present invention will be described in the following paragraphs, and relevant data and relations listed in TABLES 1 and 2 are exemplary and are not intended to limit the scope of the present invention. N represents refractive index; V represents Abbe number; D represents the outer diameter of the lens; CT represents the central thickness of the optical effective portion; ET1 represents the edge thickness of the optical effective portion; ET2 represents the minimum thickness of the connecting portion; GT represents the thickness of the sprue gate portion. The units of D, CT, ET1, ET2, GT, etc. are expressed in mm.

TABLE 1

(optical data of the embodiments)

| | Material | N | V | D | CT | ET1 | ET2 | GT |
|---|---|---|---|---|---|---|---|---|
| Embodiment 1 | EP5000 | 1.634 | 23.8 | 4.3 | 0.25 | 0.365 | 0.182 | 0.28 |
| Embodiment 2 | OKP4 | 1.607 | 26.6 | 3.98 | 0.28 | 0.29 | 0.186 | 0.316 |
| Embodiment 3 | SP3810 | 1.64 | 23.3 | 4.1 | 0.235 | 0.353 | 0.199 | 0.31 |
| Embodiment 4 | SP3810 | 1.64 | 23.3 | 4.63 | 0.31 | 0.378 | 0.226 | 0.392 |
| Embodiment 5 | OKP4HT | 1.632 | 23.4 | 4.06 | 0.25 | 0.345 | 0.213 | 0.36 |
| Embodiment 6 | SP3810 | 1.64 | 23.8 | 4.64 | 0.225 | 0.342 | 0.199 | 0.346 |
| Embodiment 7 | EP5000 | 1.634 | 23.8 | 3.1 | 0.2 | 0.292 | 0.184 | 0.295 |
| Embodiment 8 | OKP4HT | 1.632 | 23.4 | 4.76 | 0.24 | 0.318 | 0.211 | 0.326 |

TABLE 2

(relations of the embodiments)

| | D/CT | ET2/CT | ET2/ET1 | ET2/GT | CT/ET1 |
|---|---|---|---|---|---|
| Embodiment 1 | 17.2 | 0.728 | 0.499 | 0.65 | 0.685 |
| Embodiment 2 | 14.21 | 0.664 | 0.641 | 0.589 | 0.966 |
| Embodiment 3 | 17.45 | 0.847 | 0.564 | 0.642 | 0.666 |
| Embodiment 4 | 14.94 | 0.729 | 0.598 | 0.577 | 0.754 |
| Embodiment 5 | 16.24 | 0.852 | 0.617 | 0.592 | 0.725 |
| Embodiment 6 | 20.62 | 0.884 | 0.582 | 0.575 | 0.658 |
| Embodiment 7 | 15.5 | 0.92 | 0.63 | 0.624 | 0.685 |
| Embodiment 8 | 19.83 | 0.879 | 0.664 | 0.647 | 0.755 |

The First Embodiment

Figure 2:
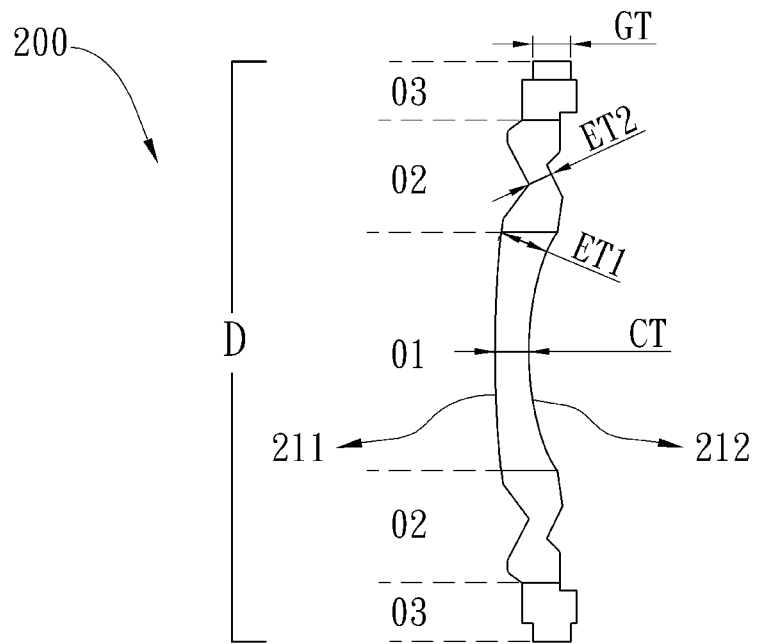
FIG. 2 shows a plastic optical lens in accordance with a first embodiment of the present invention.

FIG. 2 shows an injection-molded plastic optical lens 200 in accordance with a first embodiment of the present invention. The plastic optical lens 200 has an object-side surface 211 and a concave image-side surface 212 and comprises, in order from a center to an edge thereof: an optical effective portion 01, a connecting portion 02 and a peripheral portion 03 that are concentrically formed. The plastic optical lens 200 has an outer diameter D, and the optical effective portion 01 has an edge thickness ET1 and a central thickness CT. The rim of the optical effective portion 01 which is parallel to the optical axis is bounded by the two points on the object-side surface 211 and the image-side surface 212 through which the maximal effective diameter passes, and the base point is the one closer to the periphery of the lens; the shortest distance between the two points on the object-side surface 211 and the image-side surface 212 is the edge thickness ET1. The thickness reducing region of the connecting portion 02 has a minimum thickness ET2 for minimizing the difference in thickness between the central region and the peripheral region of the lens. The peripheral portion 03 has a sprue gate portion corresponding to a sprue gate of a lens mold through which the molten plastic material is injected to the lens mold's cavity. The sprue gate portion 03 has a thickness GT.

The detailed optical data of the first embodiment is shown in TABLE 1, and relevant relations are shown in TABLE 2, wherein the units of the thickness and the outer diameter are expressed in mm.

The Second Embodiment

Figure 3:
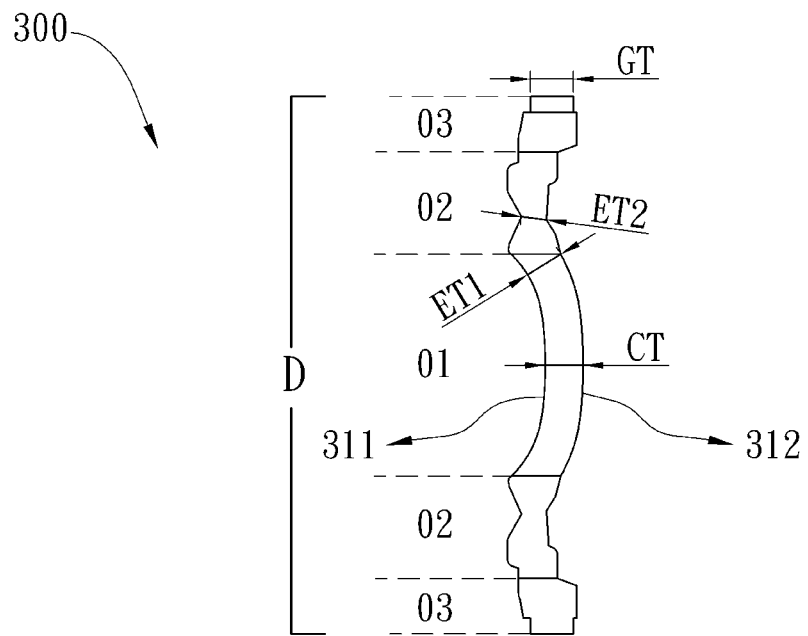
FIG. 3 shows a plastic optical lens in accordance with a second embodiment of the present invention.

FIG. 3 shows an injection-molded plastic optical lens 300 in accordance with a second embodiment of the present invention. The plastic optical lens 300 has a concave object-side surface 311 and an image-side surface 312. The definitions of the parts of the plastic optical lens 300 corresponding to the parts of the plastic optical lens 200 are the same as those set forth in the first embodiment.

The detailed optical data of the second embodiment is shown in TABLE 1, and relevant relations are shown in TABLE 2, wherein the units of the thickness and the outer diameter are expressed in mm.

The Third Embodiment

Figure 4:
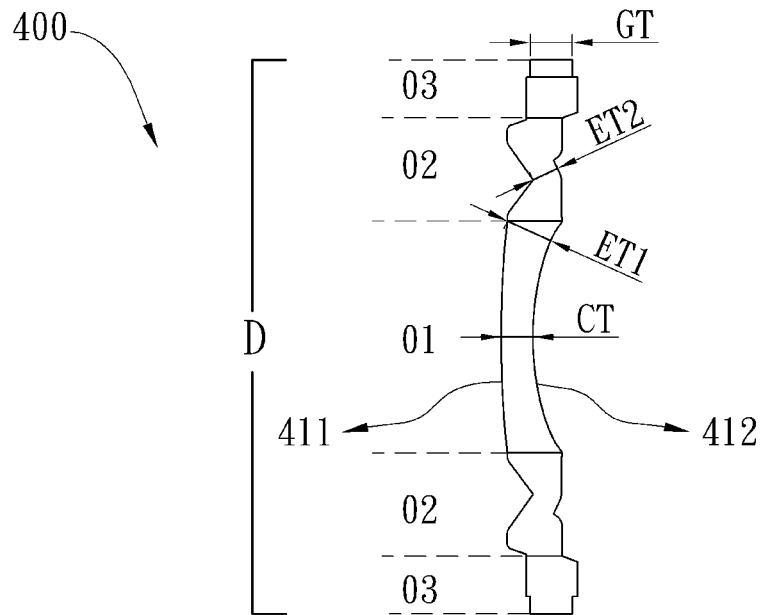
FIG. 4 shows a plastic optical lens in accordance with a third embodiment of the present invention.

FIG. 4 shows an injection-molded plastic optical lens 400 in accordance with a third embodiment of the present invention. The plastic optical lens 400 has an object-side surface 411 and a concave image-side surface 412. The definitions of the parts of the plastic optical lens 400 corresponding to the parts of the plastic optical lens 200 are the same as those set forth in the first embodiment.

The detailed optical data of the third embodiment is shown in TABLE 1, and relevant relations are shown in TABLE 2, wherein the units of the thickness and the outer diameter are expressed in mm.

The Fourth Embodiment

Figure 5:
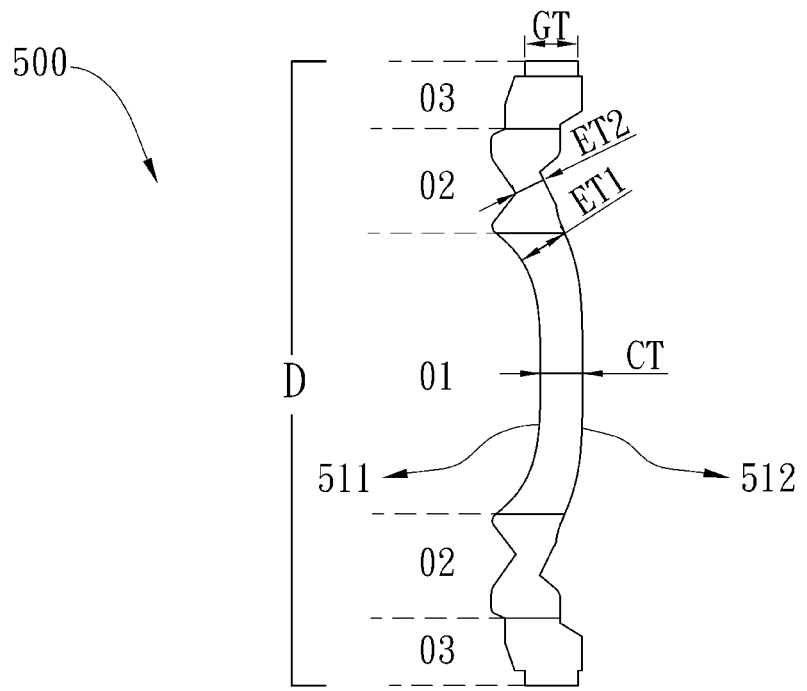
FIG. 5 shows a plastic optical lens in accordance with a fourth embodiment of the present invention.

FIG. 5 shows an injection-molded plastic optical lens 500 in accordance with a fourth embodiment of the present invention. The plastic optical lens 500 has a concave object-side surface 511 and an image-side surface 512. The definitions of the parts of the plastic optical lens 500 corresponding to the parts of the plastic optical lens 200 are the same as those set forth in the first embodiment.

The detailed optical data of the fourth embodiment is shown in TABLE 1, and relevant relations are shown in TABLE 2, wherein the units of the thickness and the outer diameter are expressed in mm.

The Fifth Embodiment

Figure 6:
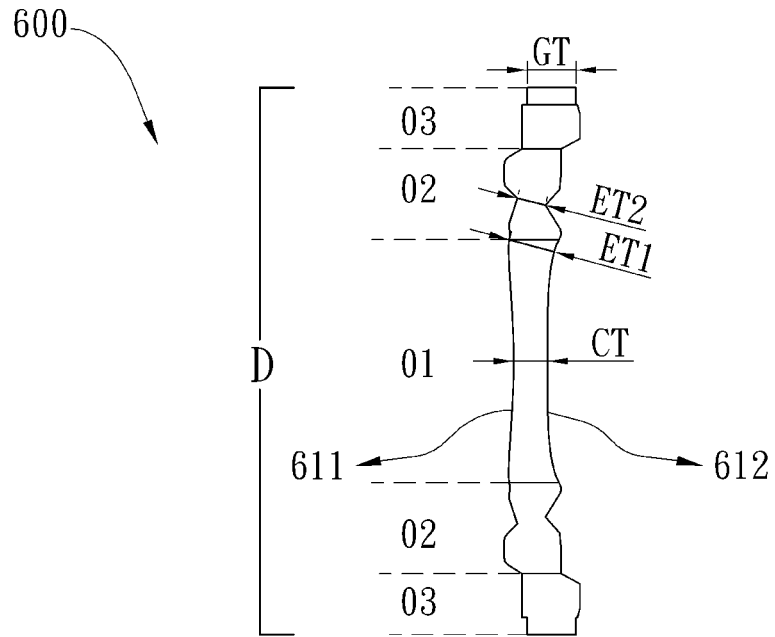
FIG. 6 shows a plastic optical lens in accordance with a fifth embodiment of the present invention.

FIG. 6 shows an injection-molded plastic optical lens 600 in accordance with a fifth embodiment of the present invention. The plastic optical lens 600 has a concave object-side surface 611 and a concave image-side surface 612. The definitions of the parts of the plastic optical lens 600 corresponding to the parts of the plastic optical lens 200 are the same as those set forth in the first embodiment.

The detailed optical data of the fifth embodiment is shown in TABLE 1, and relevant relations are shown in TABLE 2, wherein the units of the thickness and the outer diameter are expressed in mm.

The Sixth Embodiment

Figure 7:
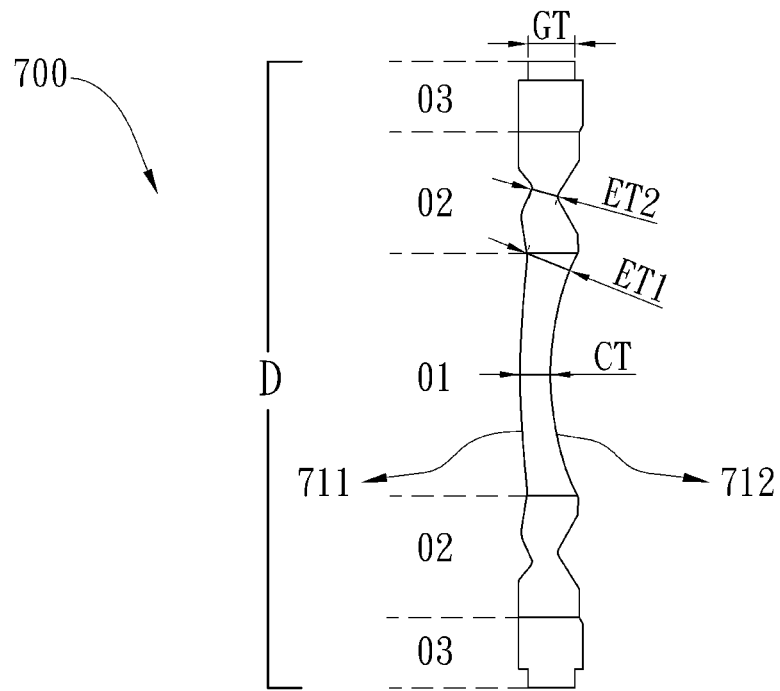
FIG. 7 shows a plastic optical lens in accordance with a sixth embodiment of the present invention.

FIG. 7 shows an injection-molded plastic optical lens 700 in accordance with a sixth embodiment of the present invention. The plastic optical lens 700 has an object-side surface 711 and a concave image-side surface 712. The definitions of the parts of the plastic optical lens 700 corresponding to the parts of the plastic optical lens 200 are the same as those set forth in the first embodiment.

The detailed optical data of the sixth embodiment is shown in TABLE 1, and relevant relations are shown in TABLE 2, wherein the units of the thickness and the outer diameter are expressed in mm.

The Seventh Embodiment

Figure 8:
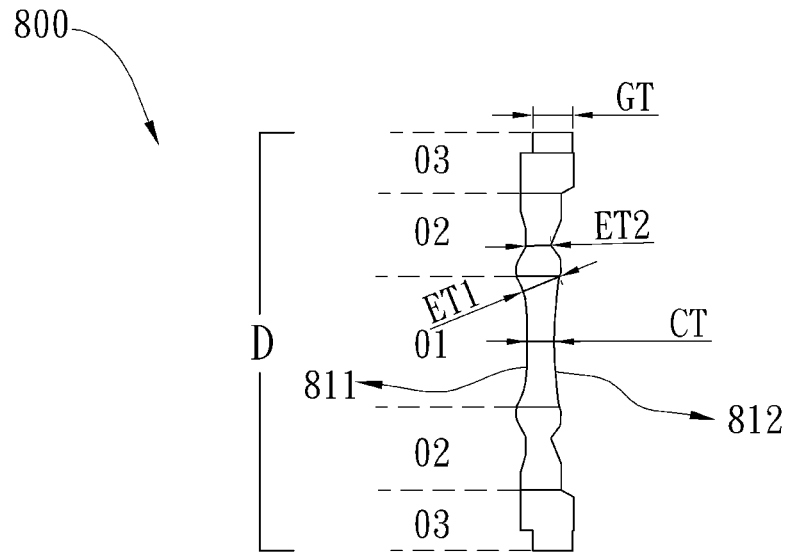
FIG. 8 shows a plastic optical lens in accordance with a seventh embodiment of the present invention.

FIG. 8 shows an injection-molded plastic optical lens 800 in accordance with a seventh embodiment of the present invention. The plastic optical lens 800 has a concave object-side surface 811 and a concave image-side surface 812. The definitions of the parts of the plastic optical lens 800 corresponding to the parts of the plastic optical lens 200 are the same as those set forth in the first embodiment.

The detailed optical data of the seventh embodiment is shown in TABLE 1, and relevant relations are shown in TABLE 2, wherein the units of the thickness and the outer diameter are expressed in mm.

The Eighth Embodiment

Figure 9:
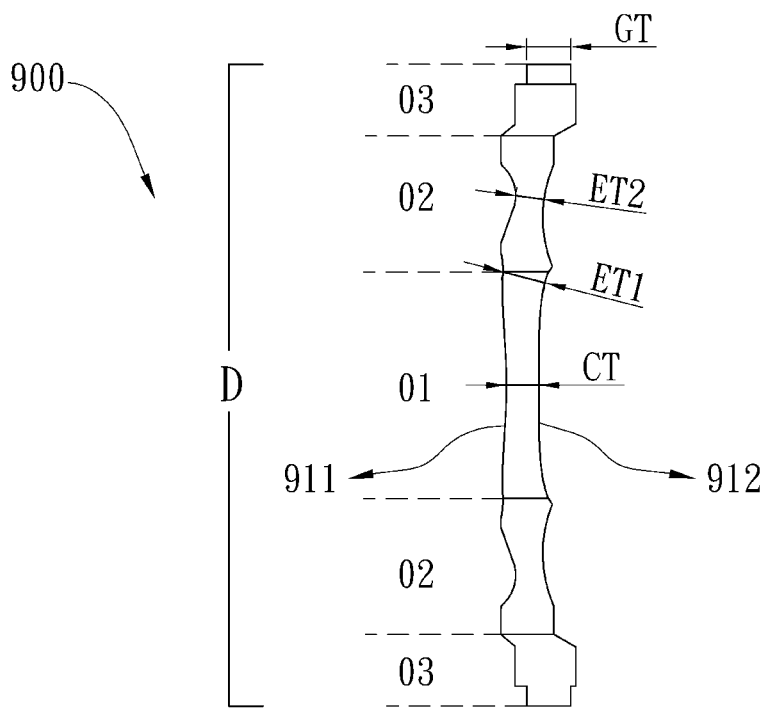
FIG. 9 shows a plastic optical lens in accordance with an eighth embodiment of the present invention.

FIG. 9 shows an injection-molded plastic optical lens 900 in accordance with an eighth embodiment of the present invention. The plastic optical lens 900 has a concave object-side surface 911 and a concave image-side surface 912. The definitions of the parts of the plastic optical lens 900 corresponding to the parts of the plastic optical lens 200 are the same as those set forth in the first embodiment.

The detailed optical data of the eighth embodiment is shown in TABLE 1, and relevant relations are shown in TABLE 2, wherein the units of the thickness and the outer diameter are expressed in mm.

At least one lens element with refractive power can be disposed at each of the object side and the image side of the plastic optical lens of the present invention to form an optical lens assembly. The number of the lens elements with refractive power does not exceed five. The optical lens assemblies incorporating the present invention will be described in the following paragraphs by referring to the accompanying drawings. It is to be noted that these optical lens assemblies are exemplary and are not intended to limit the range of application of the present invention.

Figure 10:
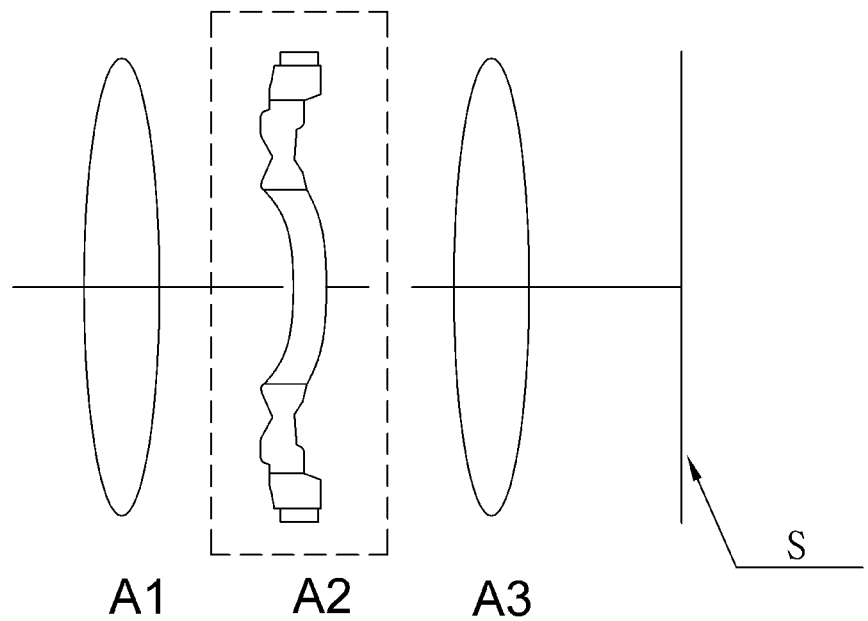
FIG. 10 shows an optical lens assembly incorporating the present invention.

FIG. 10 shows an optical lens assembly incorporating a plastic optical lens of the present invention. The optical lens assembly forms an image on an image plane S and comprises three lens elements with refractive power, in order from an object side to an image side thereof:
 a first lens element A1 with refractive power;
 a second lens element A2 with refractive power; and
 a third lens element A3 with refractive power;
 wherein the second lens element A2 is the plastic optical lens of the present invention.

Figure 11:
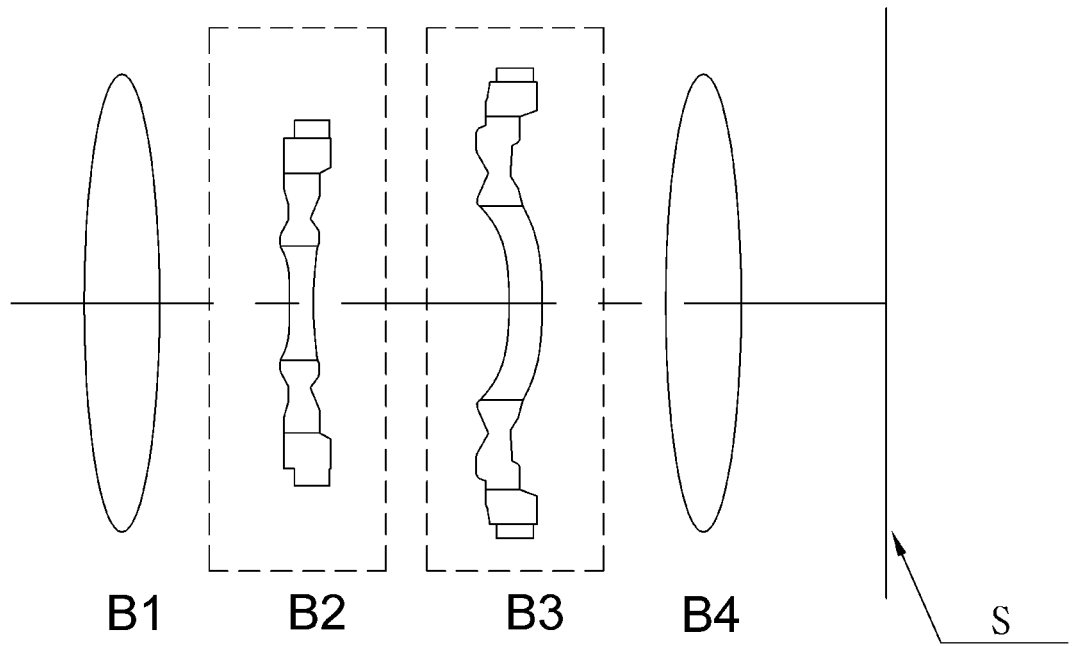
FIG. 11 shows an optical lens assembly incorporating the present invention.

FIG. 11 shows an optical lens assembly incorporating plastic optical lenses of the present invention. The optical lens assembly forms an image on an image plane S and comprises four lens elements with refractive power, in order from an object side to an image side thereof:
 a first lens element B1 with refractive power;
 a second lens element B2 with refractive power;
 a third lens element B3 with refractive power; and
 a fourth lens element B4 with refractive power;
 wherein the second lens element B2 and the third lens element B3 are plastic optical lenses of the present invention.

Figure 12:
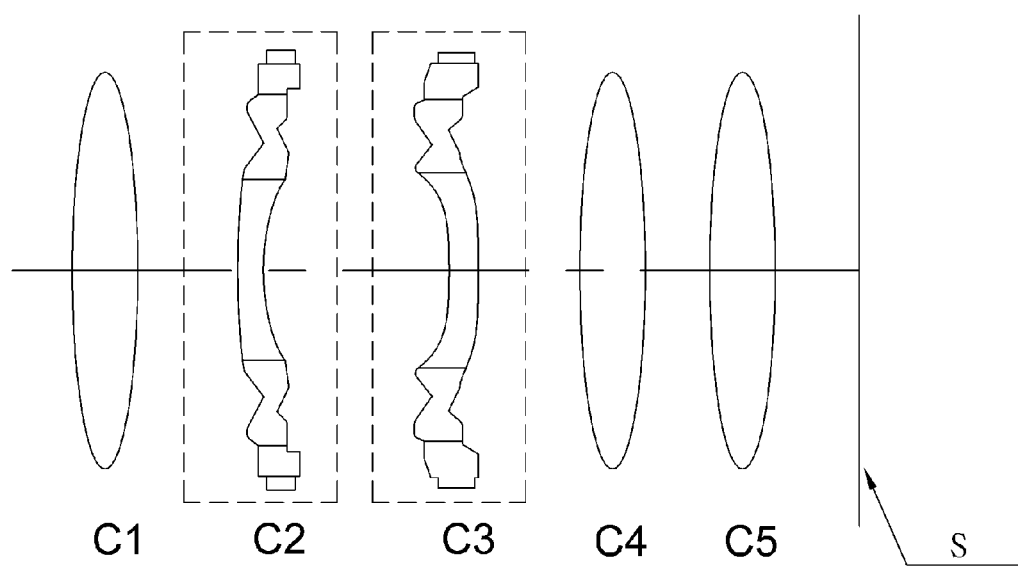
FIG. 12 shows an optical lens assembly incorporating the present invention.

FIG. 12 shows an optical lens assembly incorporating plastic optical lenses of the present invention. The optical lens assembly forms an image on an image plane S and comprises five lens elements with refractive power, in order from an object side to an image side thereof:
 a first lens element C1 with refractive power;
 a second lens element C2 with refractive power;
 a third lens element C3 with refractive power;
 a fourth lens element C4 with refractive power; and
 a fifth lens element C5 with refractive power;
 wherein the second lens element C2 and the third lens element C3 are plastic optical lenses of the present invention.

In the aforementioned three optical lens assemblies incorporating plastic optical lenses of the present invention, the plastic optical lenses satisfy the following relations:

$CT \leq 0.35$ mm, $ET2/ET1 < 1.0$,

Preferably, the plastic optical lenses satisfy the following relations:

$CT \leq 0.30$ mm, $ET2/ET1 < 0.8$, $ET2/CT < 1.2$.

What is claimed is:

1. A plastic optical lens comprising, in order from a center to an edge thereof:
    an optical effective portion;
    a connecting portion; and
    a peripheral portion;
    wherein the optical effective portion, the connecting portion, and the peripheral portion are concentrically formed; wherein the optical effective portion has an edge thickness ET1 and a central thickness CT, the connecting portion has a minimum thickness ET2, and the plastic optical lens satisfies the following relations:

$CT \leq 0.30$ mm, $ET2/ET1 < 1.0$.

2. The plastic optical lens according to claim 1, satisfying the following relation:

$ET2/CT < 1.2$.

3. The plastic optical lens according to claim 2, satisfying the following relation:

$ET2/ET1 < 0.8$.

4. The plastic optical lens according to claim 3, satisfying the following relation:

$ET2/CT < 1.0$.

5. The plastic optical lens according to claim 4, wherein the plastic optical lens has an outer diameter D and it satisfies the following relation:

$D/CT > 14$.

6. The plastic optical lens according to claim 5, satisfying the following relation:

$ET2 \leq 0.25$ mm.

7. The plastic optical lens according to claim 6, satisfying the following relation:

$ET2 \leq 0.20$ mm.

8. The plastic optical lens according to claim 6, satisfying the following relation:

$CT \leq 0.25$ mm.

9. The plastic optical lens according to claim 4, satisfying the following relation:

$CT/ET1 < 1.0$.

10. The plastic optical lens according to claim 9, satisfying the following relation:

$CT \leq 0.25$ mm.

11. The plastic optical lens according to claim 10, satisfying the following relation:

$ET2 \leq 0.20$ mm.

12. The plastic optical lens according to claim 2, wherein the peripheral portion has a sprue gate portion arranged at an outer side thereof, and the sprue gate portion has a thickness GT that satisfies the following relation:

$ET2/GT < 1.0$.

13. The plastic optical lens according to claim 12, satisfying the following relation:

$ET2/CT < 1.0$.

14. The plastic optical lens according to claim 13, satisfying the following relation:

$ET2 \leq 0.25$ mm.

15. The plastic optical lens according to claim 14, satisfying the following relation:

$ET2/GT < 0.8$.

16. The plastic optical lens according to claim 15, satisfying the following relation:

$CT \leq 0.25$ mm.

17. An optical lens assembly comprising in order from an object side to an image side:
    a first lens element with refractive power;
    a second plastic optical lens element with refractive power comprising, in order from a center to an edge thereof:
    an optical effective portion;
    a connecting portion; and
    a peripheral portion;
    wherein the optical effective portion, the connecting portion, and the peripheral portion are concentrically formed; the optical effective portion has an edge thickness ET1 and a central thickness CT, the connecting portion has a minimum thickness ET2, and they satisfy the following relations:

$CT \leq 0.30$ mm, $ET2/ET1 < 0.8$, $ET2/CT < 1.2$;

and a third lens element with refractive power.

18. The optical lens assembly according to claim 17, wherein the number of the lens elements with refractive power does not exceed five, and the third lens element is a third plastic optical lens element comprising, in order from a center to an edge thereof:
    an optical effective portion;
    a connecting portion; and
    a peripheral portion;
    wherein the optical effective portion, the connecting portion, and the peripheral portion are concentrically formed; the optical effective portion has an edge thickness ET1' and a central thickness CT', the connecting portion has a minimum thickness ET2', and they satisfy the following relations:

$CT' \leq 0.30$ mm, $ET2'/ET1' < 0.8$, $ET2'/CT' < 1.2$.

19. The optical lens assembly according to claim 17 comprising, in order from an object side to an image side thereof:
    the first lens element with refractive power;
    the second plastic optical lens element with refractive power;
    the third lens element with refractive power; and
    a fourth lens element with refractive power;
    wherein the number of the lens elements with refractive power does not exceed five.

20. The optical lens assembly according to claim 19, wherein the second plastic optical lens element satisfies the following relation:

ET2/CT<1.0.

21. The optical lens assembly according to claim 20, wherein the second plastic optical lens element satisfies the following relation:

ET2≤0.25 mm.

22. The optical lens assembly according to claim 21, wherein the second plastic optical lens element satisfies the following relation:

ET2≤0.20 mm.

23. The optical lens assembly according to claim 22, wherein the second plastic optical lens element satisfies the following relation:

CT≤0.25 mm.

24. The optical lens assembly according to claim 17, wherein the second plastic optical lens element is made of a polycarbonate-based material.

25. The optical lens assembly according to claim 24, wherein the second plastic optical lens element is made of a material containing a polar functional group.

26. The optical lens assembly according to claim 25, wherein a refractive index of the second plastic optical lens element is N, an Abbe number of the second plastic optical lens element is V, and they satisfy the following relations:

$N>1.6$, $V<32$.

27. The optical lens assembly according to claim 26, satisfying the following relation:

$V<25$.

28. The optical lens assembly according to claim 27, wherein the second plastic optical lens element satisfies the following relation:

ET2/CT<1.0.

29. The optical lens assembly according to claim 28, wherein the second plastic optical lens element satisfies the following relation:

ET2≤0.25 mm.

30. The optical lens assembly according to claim 28, wherein the second plastic optical lens element satisfies the following relation:

CT≤0.25 mm.

31. An optical lens assembly comprising in order from an object side to an image side:
    a first lens element with refractive power;
    a second plastic optical lens element with refractive power comprising, in order from a center to an edge thereof:
    an optical effective portion;
    a connecting portion; and
    a peripheral portion;
    wherein the optical effective portion, the connecting portion and the peripheral portion are concentrically formed; the optical effective portion has an edge thickness ET1 and a central thickness CT, the connecting portion has a minimum thickness ET2, and they satisfy the following relations:

CT≤0.35 mm,

ET2/ET1<1.0;

and a third lens element with refractive power.

32. The optical lens assembly according to claim 31, wherein the second plastic optical lens element has an outer diameter D and satisfies the following relation:

$D/CT>14$.

33. The optical lens assembly according to claim 32, wherein the second plastic optical lens element satisfies the following relation:

ET2≤0.25 mm.

34. The optical lens assembly according to claim 33, wherein the second plastic optical lens element satisfies the following relation:

ET2≤0.20 mm.

35. The optical lens assembly according to claim 33, wherein the second plastic optical lens element satisfies the following relation:

ET2/CT<1.0.

36. The optical lens assembly according to claim 35, wherein the second plastic optical lens element satisfies the following relation:

CT/ET1<1.0.

37. The optical lens assembly according to claim 36, wherein the second plastic optical lens element is made of a polycarbonate-based material.

38. The optical lens assembly according to claim 37, wherein the second plastic optical lens element is made of a material containing a polar functional group.

39. The optical lens assembly according to claim 38 comprising, in order from an object side to an image side thereof:
    the first lens element with refractive power;
    the second plastic optical lens element with refractive power;
    the third lens element with refractive power; and
    a fourth lens element with refractive power;
    wherein the number of the lens elements with refractive power does not exceed five; and the third lens element is a third plastic optical lens element comprising, in order from a center to an edge thereof:
    an optical effective portion;
    a connecting portion; and
    a peripheral portion;
    wherein the optical effective portion, the connecting portion and the peripheral portion are concentrically formed; the optical effective portion has an edge thickness ET1' and a central thickness CT', the connecting portion has a minimum thickness ET2', and they satisfy the following relations:

CT'≤0.35 mm,

ET2'/ET1'<1.0.

* * * * *